United States Patent [19]
Sorosinski

[11] Patent Number: 5,618,421
[45] Date of Patent: Apr. 8, 1997

[54] UNDERDRAIN FILTER PLATE INSTALLATIONS IN AUTOMATIC BACKWASH FILTER SYSTEMS

[75] Inventor: Jerome C. Sorosinski, Pasadena, Md.

[73] Assignee: Infilco Degremont Inc., Richmond, Va.

[21] Appl. No.: 607,136

[22] Filed: Feb. 26, 1996

[51] Int. Cl.[6] ................................................. B01D 24/38
[52] U.S. Cl. ............................................ 210/264; 210/275
[58] Field of Search .................................. 210/232, 264, 210/275, 284, 286, 293, 793, 794, 795

[56] References Cited

U.S. PATENT DOCUMENTS

| | | | |
|---|---|---|---|
| 2,302,450 | 11/1942 | Laughlin | 210/264 |
| 3,239,061 | 3/1966 | Horning et al. | 210/793 |
| 4,133,766 | 1/1979 | Adie | 210/293 |
| 4,617,131 | 10/1986 | Walker | 210/794 |
| 4,764,288 | 8/1988 | Walker et al. | 210/793 |
| 4,882,053 | 11/1989 | Ferri | 210/293 |
| 5,089,130 | 2/1992 | Nichols | 210/275 |

*Primary Examiner*—Ivars Cintins
*Attorney, Agent, or Firm*—Carroll F. Palmer

[57] ABSTRACT

Automatic backwash filter systems including a filter tank divided by vertical cell sheets into a multiplicity seriate cells are improved by provision, as retention for underdrain filter plates within the seriate cells, of unique contoured cell sheets having profiled faces each with a lower level, integral, protrusion segment that forms a support ledge for a cell filter plate and a higher level, integral, protrusion segment that provides a filter plate holddown feature in combination with filler members and horizontal retention bars.

7 Claims, 3 Drawing Sheets

UNDERDRAIN FILTER PLATE INSTALLATIONS IN AUTOMATIC BACKWASH FILTER SYSTEMS

BACKGROUND OF THE INVENTION

1. Field of the Invention

This application relates broadly to improvements in automatic backwash filtering systems. More particularly, it concerns improved underdrain filter plate installations in such systems.

2. Description of the Prior Art

Automatic backwash filter systems (ABFS) as known in the art are exemplified in U.S. Pat. Nos. 3,239,061; 4,133, 766; 4,617,131; 4,764,288 and 5,089,130 currently assigned to Infilco Degremont Inc., the assignee of the invention disclosed herein. The disclosures of these patents are incorporated herein by reference.

In the known automatic backwash filter systems, horizontal underdrain filter plates are typically held in place against upward movement by angle pieces which are fastened by their vertical webs to the cell sheet and with the horizontal web holding down the top surface of the filter plate. During installation of such arrangements, caulking is applied on an lateral ledge of the cell sheet, the filter plate is laid in this chaulking, additional chaulking is applied to the top edge of the underdrain plate and the retaining angle piece is then bolted to the cell sheet. The angle pieces present limited bearing surface against the underdrain plates requiring particular care with the installation and holding of the distance between cell sheets to relatively tight tolerances.

The present invention addresses problems associated with the known arraignments for mounting of underdrain filter plates in position relative to cell sheets in automatic backwash filter systems and provides improved cell sheet structures that simplify cell sheet and filter plate installation, provide firmer retention for filter plates and reduce assembly costs.

OBJECTS

A principal object of the invention is the provision of improvements in automatic backwash filtering systems.

Another object is the provision of improved underdrain filter plate installations in such systems.

A further object is to provide firmer retention for underdrain filter plates in automatic backwash filtering systems while positively placing such plates in their proper position and prevent their upward movement.

An additional object is improvement in the manner of spacing cell sheets for their installation in automatic backwash filtering systems.

Further objects include the simplification of prior methods of assembly of cell sheets in such filter systems, mitigation of problems previously associated with need for high attention to installation measurements and reduction in assembly costs.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of improvements in automatic backwash filter systems that typically comprise a filter tank defined by a bottom, first and second opposed, parallel end walls and third and fourth opposed parallel side walls with the tank divided into a multiplicity of seriate cells of substantially the same width, e.g., 8" or less to 24" or more, by a plurality of vertical substantially rectangular cell sheets each defined by a top edge, a bottom edge, a pair of side edges, a first exposed face on one side and a second exposed face on the other side. The cell sheets run parallel to the first and second end walls and each of the cells contain a horizontal rigid porous filter plate located between the exposed faces of the respective cell sheets at an underdrain position above the tank bottom.

Filter media contained in the cells is supported on the filter plates and these systems have influent means for delivering liquid to be filtered to the top of the filter media and effluent means for discharging liquid filtered through the media and the filter plates from the filter system at a level below the plates.

The improvements of the invention to such know filter systems comprise improved filter plate installation means which comprises contoured cell sheets having profiled faces containing functional segments and retention means to prevent upward movement of the filter plates.

New contoured cell sheets of the invention are each defined by a vertical longitudinal axis, a bottom edge, a top edge, a first profiled face on one side and a second profiled face on the opposite side.

The first profiled face comprises (a) a lower straight segment that includes the bottom edge, (b) an upper straight segment that includes the top edge with the lower and upper straight segments defining the facial plane of the first profiled face, (c) a first protruding segment that includes a support ledge extending beyond the facial plane normal to the longitudinal axis and (d) a second protruding segment that includes a retention section extending beyond the facial plane.

The second profiled face of each contoured cell sheet is a mirror image of the first profiled face.

Each filter plate occupying a seriate cell is defined by a bottom surface, a top surface, an aft side portion and a fore side portion. The bottom surface is supported upon the support ledge of the second profiled face of the contoured cell sheet of a first filter cell and upon the support ledge of the first profiled face of the contoured cell sheet of the second cell.

New retention means of the invention functions with each of the contoured cell sheets to engage the top surface of filter plates to secure them against upward movement in the filter cells they occupy in the filter tank.

The retention means comprises (1) the aforesaid second protruding segments in the first and second profiled faces, (2) elongated filler members and (3) elongated retention bars. Such second protruding segments include a dependent lug portion and an inverted cup portion.

The filler members advantageously are made of elastomeric material, but in some embodiments can be made of metal, plastic or wood.

The retention bars advantageously have a cross-shaped cross section or a T-shaped cross section and are made of metal or glass fiber reinforced plastic. Such bars may be of uniform longitudinal cross section or may be varied along their length, e.g., they may be bifurcated for pivoted "snap in" installation between opposed cell sheets. If these bars are of one piece construction, they should be somewhat flexible to enable them to be bent slightly so they can be snapped into position with their end protrusions properly in the filler members positioned at each end.

In a first embodiment, the elongated filler members comprise an upward facing cup portion that receives the lug portion of the second protruding segment, a vertical side juxtaposed to a profiled face of a contoured cell sheet, a horizontal side in contact with the top surface of the filter plate and a lateral facing cup portion.

In a second embodiment, the elongated filler members comprise an upward facing lip portion positioned in the dependent cup portion, a vertical side juxtaposed to profiled face of the contoured cell sheet, a horizontal side in contact with the top surface of the filter plate and a lateral facing cup portion.

In a third embodiment, the filler members are similar in shape to those of the first embodiment, but include a cavity portion facing the profile face of the cell sheet to provide space for sealing means, i.e., chaulking or equivalent. Such sealing means may also be applied between vertical ends of the filter plates and the cell sheets.

Further embodiments of the filler members and retention bars are contemplated to provide the new filter plate installation means in accordance with the invention for combination with the new cell sheets comprising the unique upper level protrusion segments.

To assist in securing the seriate filter cells against improper fluid flow therein, sealing means, e.g., caskets, chaulking or the like, may be interposed between the bottom surface of filter plates, the support ledge of the second profiled face of the first of the contoured cell sheets and the support ledge of the first profiled face of the second of the contoured cell sheets within each cell.

The new installation means of the invention maintain the spacing of cell sheets along their length while locking in the porous underdrain filter plates

BRIEF DESCRIPTION OF THE DRAWINGS

A more complete understanding of the invention can be obtained by reference to the accompanying drawings in which generic parts of the illustrated matter are indicated by arrowhead lines associated with the designation numerals while specific parts are indicated with plain lines associated with the numerals and wherein.

DESCRIPTION OF THE PREFERRED EMBODIMENTS

Figure 1:
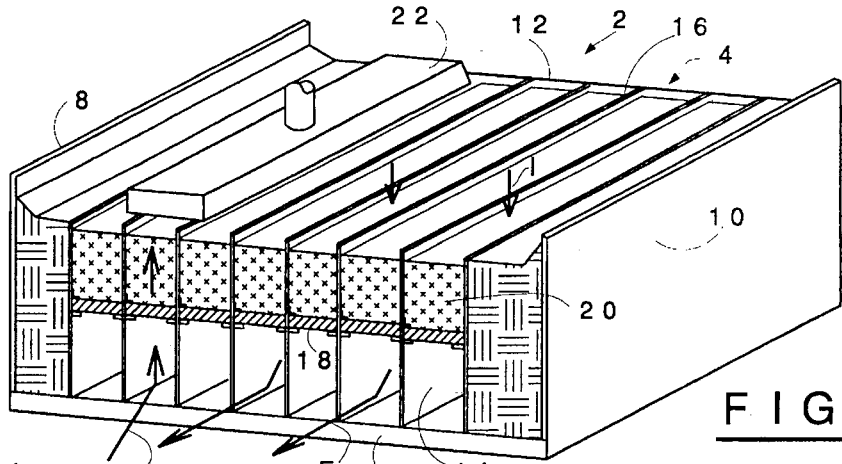
FIG. 1 is an isometric sectional view of an ABFS typical of the prior art which is improved by the invention.
Figure 2:
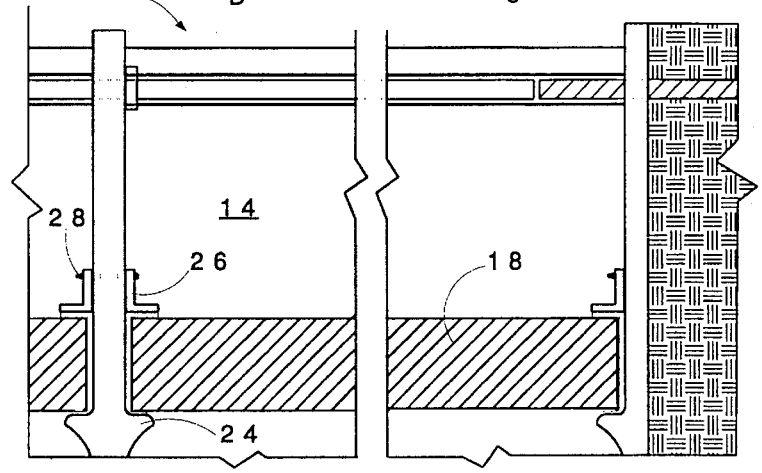
FIG. 2 is a fragmentary sectional view showing cell sheet and filter plate constructions in prior art ABFS.
Figure 3:
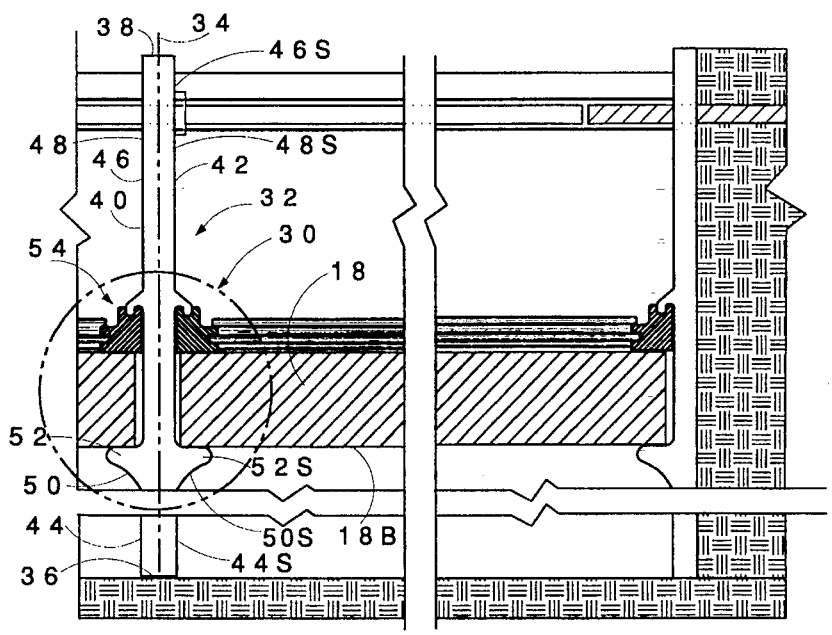
FIG. 3 is a an ABFS cell sheet and filter plate combination constructed in accordance with the invention.

Referring in detail to the drawings, FIGS. 1 & 2 illustrate a prior type automatic backwash filter system 2 comprising a filter tank 4 having a bottom 6, opposed parallel end walls 8 & 10 and opposed parallel side walls 12 (one not shown). The tank 4 is divided into a multiplicity of seriate cells 14 of substantially the same width by a plurality of parallel vertical cell sheets 16.

Each of the cells contains a horizontal rigid porous filter plate 18 positioned between the respective the cell sheets 16 defining each cell 14 and at a fixed position above the bottom 6. Filter media 20 is contained in the cells 14 and supported on the porous plates 18. The filter media and other portions of FIGS. 2–11 are not hatched for the sake of clarity.

Influent means (not shown) delivers liquid to be filtered to the top of the filter media as indicated by the arrows "I" and effulent means (not shown) discharges liquid filtered through media 20 and underdrain filter plates 18 from the filter system 4 at a level below the plates 18 as indicted by the arrows "E".

In operation of the systems 2, washwater hood 22 cooperates with additional washwater means (not shown) to move backwash water in the direction of the arrows "B" up through plates 18 and media 20 in one of the cells 14 below the head 22. Meanwhile, in the other cells, the flow of water is downward as indicated by the arrows "I" and "E". When the backwashing of a cell, which is referred to below as the "first" cell, is completed, the hood 22 travels to the next seriate cell, which is referred to as the "second" cell, and a backwash cycle is performed on the second cell. This procedure continues seriatim until all the cells in the tank 4 have been backwashed. The hood can then travel a reverse route, i.e., right to left, for backwashing or can move back to its initial starting point to repeat further washing in the same single direction, i.e. left to right.

The flow of liquid both downward and upward through the cells 14 exert related directional forces against the filter plates 18 so support means is required to stabilize the plates 18. In the prior ABFS, this has been supplied by integral ledges 24 on the cell sheets 16 to support the filter plates 18 from beneath and angle pieces 26 fastened to the cell sheets 16 by bolts 28 to mitigate upward movement of the plates 18.

The know ABFS as typically described above are improved in accordance with the invention by unique filter plate installation means 30 which comprises contoured cell sheets 32 each defined by a vertical longitudinal axis 34, a bottom edge 36, a top edge 38, a first profiled face 40 on one side and a second profiled face 42 on the opposite side.

The first profiled face 40 comprises a lower straight segment 44 that includes the bottom edge 36, an upper straight segment 46 that includes the top edge 38, the lower and upper straight segments defining the facial plane 48 of the first profiled face and a first protruding segment 50 that includes a support ledge 52 extending beyond the facial plane 48 normal to the longitudinal axis 34.

The second profiled face 42 is a mirror image of the first profiled face 40 and comprises a lower straight segment 44S that includes the bottom edge 36, an upper straight segment 46S that includes the top edge 38, the lower and upper straight segments defining the facial plane 48S of the second profiled face 42 and a second protruding segment 50S that includes a support ledge 52S extending beyond the facial plane 48S normal to the longitudinal axis 34.

The first profiled face 40 of a cell sheet 30 defines the aft side of a first cell, i.e., a cell in the backwash cycle, while the second profiled face 42 defines the fore side of a second cell, i.e., a cell downstream of the first cell.

Individual filter plates 18 are defined by a bottom surface 18B, a top surface 18T, an aft side portion 18A and a fore side portion 18F. The fore side portion 18F of each plate 18 is supported upon the support ledge 52S of a second profiled face 42 of a contoured cell sheet 32 and upon the support ledge 52F of a first profiled face 40 of the contoured cell sheet 32.

The new installation means 30 of the invention further comprises retention means 54 associated with each of the contoured cell sheets 32 to engage the top surface 18T of the filter plates 18 to secure them against upward movement in the filter tank 4.

The retention means 54 comprises second protruding segments 56 in the first and second profiled faces 40 & 42, elongated filler members 58 and elongated retention bars 60.

The second protruding segments 56 include a dependent lug portion 62 and an inverted cup portion 64.

Figure 4:
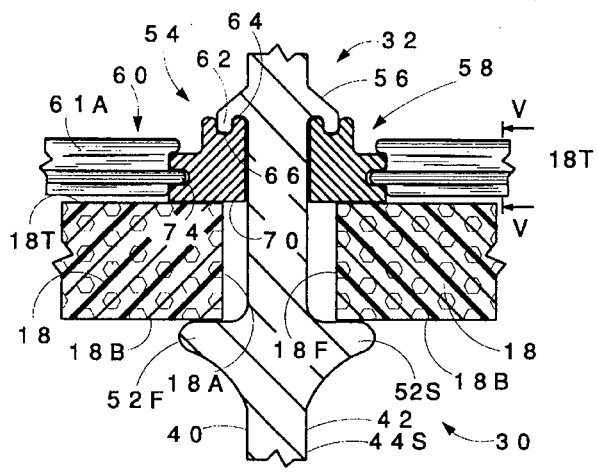
FIG. 4 is an enlarged fragmentary sectional view of the encircled portion of FIG. 3.

In a first embodiment as shown in FIG. 4, the elongated filler members 58F comprise an upward facing cup portion 66 that receives the lug portion 62, a vertical side 68 juxtaposed to a profiled face 40 or 42 of a contoured cell sheet 32, a horizontal side 70 in contact with the top surface of the filter plate 18 and a lateral facing cup portion 72.

Figure 6:
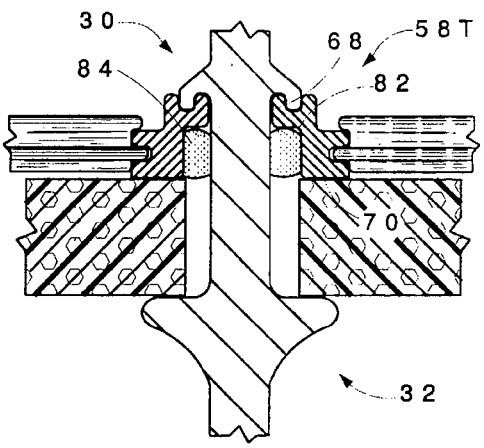
FIG. 6 is an enlarged fragmentary sectional view similar to FIG. 4 of a second embodiment in accordance with the invention.
Figure 7:
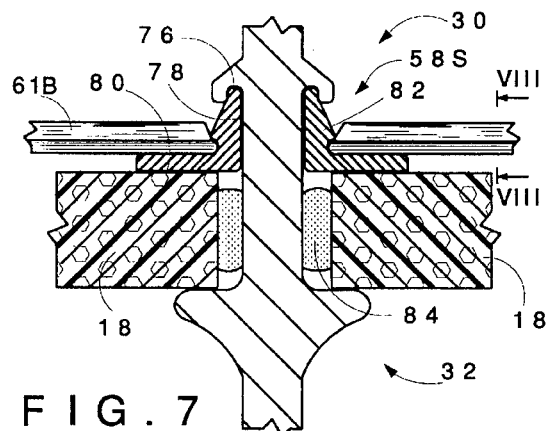
FIG. 7 is an enlarged fragmentary sectional view similar to FIG. 4 of a third embodiment in accordance with the invention.
Figure 9:
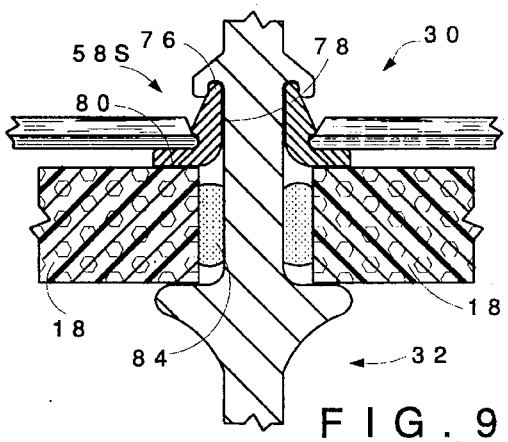
FIG. 9 is an enlarged fragmentary sectional view similar to FIG. 4 of a fourth embodiment in accordance with the invention.
Figure 5:
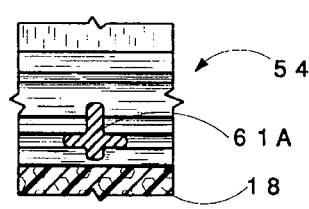
FIG. 5 is a sectional view taken on the line V—V of FIG. 4.
Figure 8:
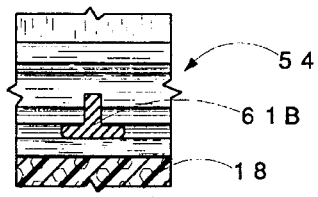
FIG. 8 is a sectional view taken on the line VIII—VIII of FIG. 7.

The elongated retention bars 60 may take several configurations, e.g., 61A as in FIGS. 4 & 6 with a cross-shaped cross section as shown in FIG. 5, or 61B as in FIGS. 7 & 9 with a T-shaped cross section as shown in FIG. 8, but they all include a lateral facing lip portion 74 that extends into a lateral facing cup portion 72 of a filler member 58.

In a second embodiment as shown in FIGS. 7 & 9, the elongated filler members 58S comprise an upward facing lip portion 76 positioned in the dependent cup portion, a vertical side 78 juxtaposed to profiled face of the contoured cell sheet 32, a horizontal side 80 in contact with the top surface of the filter plate and a lateral facing cup portion 82. The junction between sides 78 & 80 may be heavily filleted as shown in FIG. 9.

In a third embodiment as shown in FIG. 6, the filler members 58T are similar in shape to the members 58, but include a cavity portion 82 facing the profile face of the cell sheet 32 to provide space for sealing means 84, i.e., chaulking or equivalent. Such sealing means 84 may also be applied between vertical ends of the filter plates and the cell sheets as shown in FIGS. 7 & 9.

Figure 10:
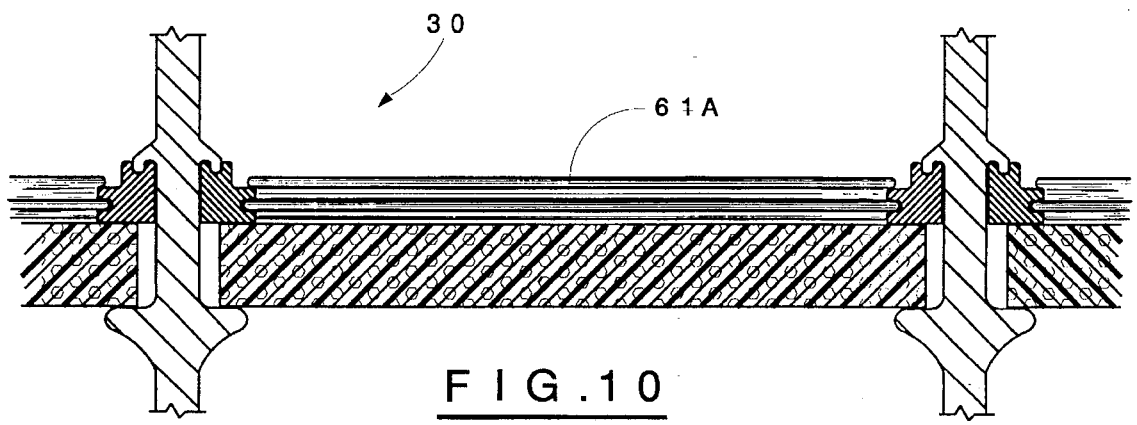
FIG. 10 is a fragmentary sectional cell-wide view of a filter plate/cell sheet arrangement comprising the embodiment shown in FIG. 4.

FIG. 10 shows the full length of a retention bar 61A which has uniform longitudinal cross section as shown in FIG. 5. Retention bars of this type should have sufficient flexibility to enable slight bending to permit proper insertion of their ends into respective filler members for completion of a cell installation. The larger radius of the filler member shown in FIG. 9 also assists in "snap in" of the retention bars. Use of elastomeric materials for construction of the filler members also aids in retention bar insertions, e.g., softer or more elastic filler members should be used with rigid retention bars, while more flexible retention bars will accommodate firmer filler members.

Figure 11:
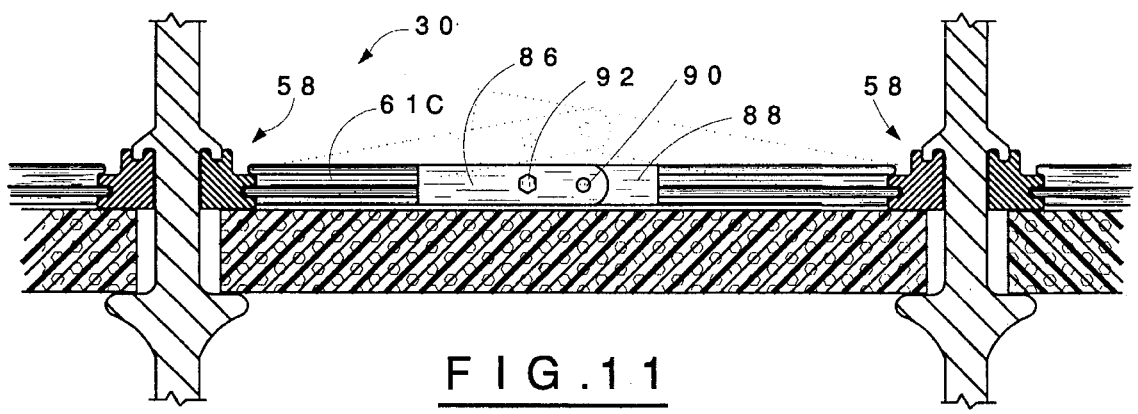
FIG. 11 is a fragmentary sectional cell-wide view of a filter plate/cell sheet arrangement comprising a modification of that shown in FIG. 10.

Alternatively, FIG. 11 shows the full length of a retention bar 61C which is bifurcated and contains central portions 86 and 88 of rectangular cross section pivoted together by pin 90 and fixed in the longitudinal configuration by the through bolt 92. Removal of the bolt 92 permits upward breaking of the bar 61C as shown in phantom for ease of installation between the opposed filler members 58. Such style of retention bars can effectively be used with rigid and high durometer filler members.

We claim:

1. In an automatic backwash filter system that includes a filter tank having a bottom and being divided into a multiplicity of seriate cells of substantially the same width containing filtration material and defined by a plurality of parallel vertical cell sheets, each of said cells containing a horizontal rigid porous filter plate positioned between the pair of said cell sheets defining said each cell and at a fixed position above said bottom, the improvement of filter plate installation means which comprises:

contoured cell sheets each defined by a vertical longitudinal axis, a bottom edge, a top edge, a first profiled face on one side and a second profiled face on the opposite side, said first profiled face comprising a lower straight segment that includes said bottom edge, an upper straight segment that includes said top edge, said lower and upper straight segments defining the facial plane of said first profiled face, a first protruding segment that includes a support ledge extending beyond said facial plane normal to said longitudinal axis and a second protruding segment that includes a retention section extending beyond said facial plane normal to said longitudinal axis, said second profiled face being a mirror image of said first profiled face, each said filter plate being defined by a bottom surface, a top surface, an aft side portion and a fore side portion, said bottom surface being supported at said aft side portion upon said support ledge of a profiled face of one of said contoured cell sheets and at said fore side portion upon said support ledge of a profiled face of a second of said contoured cell sheets and retention means in combination with each said contoured cell sheets to engage said top surface of said filter plate to secure it against upward movement in said filter tank comprising said second protruding segments in said first and second profiled faces, elongated filler members and elongated retention bars.

2. The automatic backwash filter system of claim 1 wherein said second protruding segments include a dependent lug portion, said elongated filler members comprise an upward facing cup portion that receives said lug portion, a vertical side spaced relative to a said profiled face of a said contoured cell sheet, a horizontal side in contact with said top surface of said filter plate and a lateral facing cup portion, and said elongated retention bars include a lateral facing lip portion that extends into said lateral facing cup portion.

3. The automatic backwash filter system of claim 1 wherein said second protruding segment includes a dependent cup portion, said elongated filler members comprise an upward facing lip portion positioned in said dependent cup portion, a vertical side juxtaposed to said first profiled face of said contoured cell sheet, a horizontal side in contact with said top surface of said filter plate and a lateral facing cup portion, and said elongated retention bar includes a lateral facing lip portion that extends into said lateral facing cup portion.

4. The automatic backwash filter system of claim 1 wherein said retention bars have a cross-shaped cross section.

5. The automatic backwash filter system of claim 1 wherein said retention bars have a T-shaped cross section.

6. The automatic backwash filter system of claim 1 wherein said retention bars are bifurcated for pivotal action during installation in said automatic backwash filter system.

7. In an automatic backwash filter system that includes a filter tank having a bottom and being divided into a multiplicity of seriate cells of substantially the same width containing filtration material and defined by a plurality of parallel vertical cell sheets, each of said cells containing a horizontal rigid porous filter plate positioned between the pair of said cell sheets defining said each cell and at a fixed position above said bottom, the improvement of filter plate installation means which comprises:

contoured cell sheets each defined by a vertical longitudinal axis, a bottom edge, a top edge, a first profiled face on one side and a second profiled face on the opposite side, said first profiled face comprising a lower straight segment that includes said bottom edge, an upper straight segment that includes said top edge, said lower and upper straight segments defining the facial plane of said first profiled face, a first protruding segment that includes a support ledge extending beyond said facial plane normal to said longitudinal axis and a second protruding segment that includes a retention section extending beyond said facial plane normal to said longitudinal axis, said second profiled face being a mirror image of said first profiled face, each said filter plate being defined by a bottom surface, a top surface, an aft side portion and a fore side portion, said bottom surface being supported at said aft side portion upon said support ledge of a profiled face of one of said contoured cell sheets and at said fore side portion upon said support ledge of a profiled face of a second of said contoured cell sheets and retention means in combination with each said contoured cell sheets to engage said top surface of said filter plate to secure it against upward movement in said filter tank comprising said second protruding segments in said first and second profiled faces, elongated filler members and elongated retention bars, said second protruding segments include a dependent lug portion and an inverted cup portion, said elongated filler members comprise an upward facing cup portion that receives said lug portion, a vertical side juxtaposed to a said profiled face of a said contoured cell sheet, a horizontal side in contact with said top surface of said filter plate and a lateral facing cup portion, and said elongated retention bars include a lateral facing lip portion that extends into said lateral facing cup portion.

* * * * *